United States Patent
Liao

(10) Patent No.: US 11,929,965 B2
(45) Date of Patent: Mar. 12, 2024

(54) INFORMATION PRESENTATION METHOD, APPARATUS, ELECTRONIC DEVICE, AND STORAGE MEDIUM

(71) Applicant: BEIJING BYTEDANCE NETWORK TECHNOLOGY CO., LTD., Beijing (CN)

(72) Inventor: Yudong Liao, Beijing (CN)

(73) Assignee: BEIJING BYTEDANCE NETWORK TECHNOLOGY CO., LTD. (CN)

(*) Notice: Subject to any disclaimer, the term of this patent is extended or adjusted under 35 U.S.C. 154(b) by 0 days.

(21) Appl. No.: 17/881,940

(22) Filed: Aug. 5, 2022

(65) Prior Publication Data
US 2022/0377030 A1 Nov. 24, 2022

Related U.S. Application Data

(63) Continuation of application No. PCT/CN2021/087697, filed on Apr. 16, 2021.

(30) Foreign Application Priority Data

Apr. 30, 2020 (CN) .......................... 202010366950.1

(51) Int. Cl.
G06F 15/16 (2006.01)
H04L 51/04 (2022.01)
H04L 51/224 (2022.01)

(52) U.S. Cl.
CPC ............ *H04L 51/04* (2013.01); *H04L 51/224* (2022.05)

(58) Field of Classification Search
CPC ....... H04L 51/04; H04L 51/224; H04L 51/42; H04L 51/046
See application file for complete search history.

(56) References Cited

U.S. PATENT DOCUMENTS 8,375,309 B2* 2/2013 Fioretti ................. H04L 51/046
715/753
2004/0064514 A1 4/2004 Daniell et al.
(Continued)

FOREIGN PATENT DOCUMENTS

CN 1494786 A 5/2004
CN 1801787 A 7/2006
(Continued)

OTHER PUBLICATIONS

International Search Report dated Jul. 15, 2021 in International Patent Application No. PCT/CN2021/087697.
(Continued)

*Primary Examiner* — John B Walsh

(57) ABSTRACT

An information presentation method, an apparatus, an electronic device, and a storage medium are provided. The method includes: obtaining status information for a target message in an instant messaging IM conversation, wherein the target message comprises a message sent by a first user and/or a second user with respect to a target piece of mail, the target piece of mail being a piece of mail shared by the first user with the second user, or is a piece of mail shared by the second user with the first user; presenting the status information on an interface of a mailbox client end of a first user and/or a mailbox client end of a second user on the basis of the status information for the target message. The technical solutions of embodiments can facilitate heightened user interaction efficiency, and improve user experience.

19 Claims, 3 Drawing Sheets

(56) References Cited

U.S. PATENT DOCUMENTS

| | | |
|---|---|---|
| 2004/0078448 A1* | 4/2004 | Malik .................. H04L 63/102 709/206 |
| 2005/0030937 A1 | 2/2005 | Wick et al. |
| 2005/0091314 A1 | 4/2005 | Blagsvedt et al. |
| 2006/0101119 A1 | 5/2006 | Qureshi et al. |
| 2012/0124148 A1 | 5/2012 | Hamlin et al. |
| 2013/0014063 A1 | 1/2013 | Bocking |
| 2014/0164523 A1 | 6/2014 | Bank et al. |
| 2015/0127755 A1 | 5/2015 | Roh et al. |
| 2015/0229598 A1 | 8/2015 | Peng et al. |
| 2018/0343214 A1 | 11/2018 | Shen |
| 2018/0351901 A1* | 12/2018 | Snider .................. G06N 20/00 |
| 2019/0266031 A1 | 8/2019 | Wu et al. |
| 2020/0169522 A1 | 5/2020 | Lee et al. |
| 2021/0067475 A1 | 3/2021 | Chen et al. |
| 2022/0086271 A1 | 3/2022 | Luo |

FOREIGN PATENT DOCUMENTS

| | | |
|---|---|---|
| CN | 101179520 A | 5/2008 |
| CN | 101459628 A | 6/2009 |
| CN | 101594318 A | 12/2009 |
| CN | 101771629 A | 7/2010 |
| CN | 103200542 A | 7/2013 |
| CN | 103747132 A | 4/2014 |
| CN | 108156070 A | 6/2018 |
| CN | 110191231 A | 8/2019 |
| CN | 108476165 B | 7/2021 |
| EP | 2 458 802 A1 | 5/2012 |
| JP | 2004362138 A | 12/2004 |
| JP | 2007521697 A | 8/2007 |
| JP | 2019533922 A | 11/2019 |
| JP | 2020057382 A | 4/2020 |
| KR | 101839050 B1 | 3/2018 |
| WO | 2009086765 A1 | 7/2009 |
| WO | 2012064876 A2 | 5/2012 |
| WO | 2014068745 A1 | 5/2014 |

OTHER PUBLICATIONS

Extended European Search Report and Search Opinion dated Aug. 10, 2023 in European Application No. 21797033.4 (11 pages).
Liliana Ardissono et al., "Context-dependent awareness support in open collaboration environments," Springer Science +Business Media BV, Aug. 17, 2011, pp. 223-254 (32 pages).
Notice of Reasons for Refusal dated Dec. 12, 2023 in Japanese Application No. 2022-563489, with English translation (15 pages).
Microsoft Teams Quick Guide, Microsoft Corporation, Nov. 2019 (103 pages).

* cited by examiner

INFORMATION PRESENTATION METHOD, APPARATUS, ELECTRONIC DEVICE, AND STORAGE MEDIUM

The present disclosure is a continuation of International Application No. PCT/CN2021/087697, filed on Apr. 16, 2021 which claims the priority to Chinese Patent Application No. 202010366950.1, titled "METHOD AND APPARATUS FOR DISPLAYING INFORMATION, ELECTRONIC DEVICE, AND STORAGE MEDIUM", filed on Apr. 30, 2020, both of which are incorporated herein by reference in their entireties.

FIELD

The embodiments of the present disclosure relate to computer technology, and in particular, to a method and an apparatus for displaying information, an electronic device, and a storage medium.

BACKGROUND

With the rapid development of computer technology and an increasing demand of a user, usually the user is required to share a mail with other users, so that the user and other users may communicate and discuss based on mail information.

SUMMARY

According to the embodiments of the present disclosure, a method and an apparatus for displaying information, an electronic device, and a storage medium are provided, which is beneficial to improving the interactive efficiency among users and the user experience.

In a first aspect, a method for displaying information is provided according to an embodiment of the present disclosure. The method includes:

acquiring state information of a target message in an instant messaging IM conversation, where the target message includes a message sent by a first user and/or a second user for a target mail, and the target mail is a mail shared by the first user with the second user, or a mail shared by the second user with the first user; and displaying the state information on an interface of an email client of the first user and/or an interface of an email client of the second user, based on the state information of the target message.

In a second aspect, an apparatus for displaying information is further provided according to an embodiment of the present disclosure. The apparatus includes a state information detection module and a display module.

The state information detection module is configured to acquire state information of a target message in an instant messaging IM conversation, where the target message includes a message sent by a first user and/or a second user for a target mail, and the target mail is a mail shared by the first user with the second user, or a mail shared by the second user with the first user.

The display module is configured to display the state information on an interface of an email client of the first user and/or an interface of an email client of the second user, based on the state information of the target message.

In a third aspect, an electronic device is further provided according to an embodiment of the present disclosure. The electronic device includes one or more processors, and a memory configured to store one or more programs.

The one or more programs, when executed by the one or more processors, cause the one or more processors to implement the method for displaying the information according to any one of the embodiments of the present disclosure.

In a fourth aspect, a computer readable storage medium storing a computer program thereon is further provided according to an embodiment of the present disclosure. The program, when executed by a processor, causes the processor to implement the method for displaying the information according to any one of the embodiments of the present disclosure.

In the technical solution according to the embodiments of the present disclosure, after a first user shares a target mail with a second user, or the second user shares the target mail with the first user, state information of a target message in an instant messaging IM conversation is acquired. The state information is displayed on an interface of an email client of the first user or an interface of an email client of the second user based on the state information. Therefore, the user may know whether the target message exists in the IM conversation to which the user belongs, on the email client, so as to improve the interactive efficiency among users.

BRIEF DESCRIPTION OF THE DRAWINGS

In conjunction with the drawings and with reference to the following embodiments, the above and other features, advantages and aspects of the embodiments of the present disclosure are more apparent. Throughout the drawings, the same or similar reference numbers refer to the same or similar elements. It should be understood that the drawings are schematic and that the components and elements are not necessarily drawn to scale.

DETAILED DESCRIPTION OF EMBODIMENTS

Figure 1:
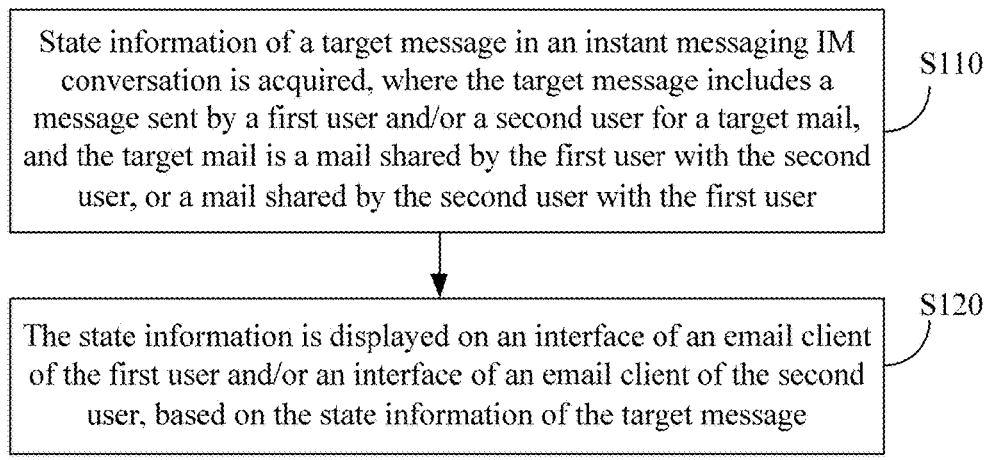
FIG. 1 is a schematic flowchart of a method for displaying information according to a first embodiment of the present disclosure.

The embodiments of the present disclosure are described in detail below with reference to the drawings. Although some embodiments of the present disclosure are shown in the drawings, it should be understood that the present disclosure may be implemented in various forms and should not be limited to the embodiments. The embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or an omitted step that is not shown herein. The scope of the present disclosure is not limited in this aspect.

The term "include" and its variations in the present disclosure mean open-ended inclusion, that is, "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the concepts such as "first" and "second" mentioned in the present disclosure are used to distinguish different devices, modules or units, and are not used to limit an sequential order or interdependence of the functions performed by the devices, modules or units.

It should be noted that the modifications such as "one" and "multiple" mentioned in the present disclosure are illustrative and not restrictive. Those skilled in the art should understand that the modifications should be understood as "one or more" unless otherwise expressly indicated in the context.

In a process of implementing the present disclosure, the applicant of the present disclosure has discovered that, after a user shares a mail with other users, all the users may communicate and discuss the shared mail in an instant messaging (IM) conversation, so that the IM conversation in a client of the user may receive a conversation message sent by other users. In order to know the conversation message sent by other users in time, the user is required to keep the IM conversation always open, that is, the IM conversation is always in a display state, to wait the user to view the conversation message sent by other users in the IM conversation. In view of this, according to some embodiments of the present disclosure, state information may be displayed on an interface of an email client of a first user and/or an interface of an email client of a second user based on the state information. Therefore, the user may know whether a target message exists in an IM conversation to which the user belongs, on the email client, so as to improve the interactive efficiency between users.

First Embodiment

FIG. 1 is a schematic flowchart of a method for displaying information according to a first embodiment of the present disclosure. The embodiment may be applicable to a case where a message state is displayed on an interface of an email client of a sharer or an interface of an email client of a sharee. The method may be performed by an apparatus for displaying information, and the apparatus may be implemented by means of software and/or hardware, and is integrated into an email client of a first user. The email client may be integrated in a personal computer (PC) or a mobile terminal. As shown in FIG. 1, the method includes the following S110 and S120.

In S110, state information of a target message in an instant messaging IM conversation is acquired, where the target message includes a message sent by a first user and/or a second user for a target mail, and the target mail is a mail shared by the first user with the second user, or a mail shared by the second user with the first user.

The IM conversation may refer to a conversation that includes the first user and the second user, in which information of the target mail is shared. Thus, the first user and the second user may send a conversation message for the target mail in the IM conversation for communication and discussion. If the sharer shares the target mail to an IM user group, the IM conversation may refer to a group conversation corresponding to the IM user group. If the sharer shares the target mail to a single IM user, the IM conversation may refer to a private conversation formed by the single IM user and the sharer. The IM conversation may refer to an IM conversation in an IM client, or may refer to an IM conversation embedded in an email client. The IM conversation in the IM client and the IM conversation embedded in the email client may be different IM conversations. Alternatively, the IM conversation in the IM client and the IM conversation embedded in the email client may be the same IM conversation, so that the user may send and view the conversation message in both the IM client and the email client through synchronous display. An unread message may be a conversation message which is sent by the second user for the target mail in the IM conversation, but not yet read by the first user. The conversation message sent by the second user for the target mail may refer to any message sent by the second user after information of the target mail has been shared in the IM conversation. For example, the second user may send a conversation message related to specific information of the target mail, or may send a conversation message that does not involve information of the target mail, for instance a reply message to a conversation message sent by other users, such as "oh", "um", etc.

The target mail may refer to a mail shared between the first user and the second user, that is, a mail shared by the first user with the second user, or a mail shared by the second user with the first user. The first user may refer to any user who shares the target mail. The second user may refer to other users except the first user among all users sharing the target mail. The first user may refer to a sharer or sharee of the target mail. For example, an email client of the sharer shares the target mail to an IM conversation including the sharer and the sharee based on IM information of the sharee, in response to a mail sharing operation triggered by the sharer. In this case, the sharer of the target mail may be regarded as the first user, and correspondingly the sharee of the target mail may be regarded as the second user.

Here, the state information of the target message may be any message that can characterize a state of the target message in the IM conversation. For example, the state information of the target message may include, but not be limited to at least one of: state information for indicating whether the target message has been read by an information receiver, state information for indicating whether the target message in the IM conversation is set with a preset mark, and the like.

For example, it is assumed that the state information of the target message is configured to indicate whether the target message has been read by the information receiver. In a scenario where the email client of the first user shares the target mail with the second user, or the email client of the first user obtains the target mail shared by the second user, the second user may send a conversation message to the first user in the IM conversation. Therefore, the email client of the first user may detect in real time whether an unread message sent by the second user exists in the IM conversation, so that the unread message sent by the second user may be known in time. For example, if the first user does not read the conversation message sent by the second user in time, that is, an unread message sent by the second user exists in the IM conversation, an IM server may add unread message information to a message queue. The email client of the sharer may acquire the unread message information in real time by subscribing to the message queue, in the case that the unread message sent by the second user exists. Based on the unread message information, the email client of the sharer may determine that an unread message sent by the second user exists currently. Therefore, the email client of the first user may determine whether the unread message sent by the second user exists in the IM conversation of the first user by monitoring the message queue in real time.

It should be noted that the target mail shared by the sharer through the mail sharing operation may be controlled by the sharer. In an embodiment, operation permission of the sharee for the target mail obtained by sharing of the sharer is a temporal permission. The temporary permission of the sharee for the target mail is limited by an operation triggered by the sharer. For example, in response to a sharing end operation triggered by the sharer, the target mail becomes invisible for the sharee. If the target mail is a received mail or a sent mail in the mailbox of the sharer, the sharer does not modify content of the target mail when sharing the target mail. That is, the receiving end may display at least a part of the target mail determined based on the temporary permission as the target mail, regardless a type of the temporary permission assigned to the sharee by the sharer. The sharer may set different mail processing permissions for different receivers. Compared with forwarding a mail, the mail forwarded by a mail forwarding operation is a mail which has been received by a forwarder. Thus, the forwarded mail is not controlled by the forwarder. In addition, content of a mail to be forwarded in the mailbox can be modified, and different receivers of the forwarded mail have the same mail processing permission. Thus, the mail sharing operation differs from the existing mail forwarding operation.

In S120, the state information is displayed on an interface of an email client of the first user and/or an interface of an email client of the second user, based on the state information of the target message.

In an embodiment, the state information of the target message may only be displayed on an interface of an email client of a message receiver to prompt the message receiver (i.e., a user receiving the target message) for the state information of the target message currently received. The state information of the target message may also only be displayed on an interface of an email client of a message sender (i.e., a user sending the target message) to prompt the message sender for the state information of the target message currently sent. The state information of the target message may also be displayed on the interface of the email client of the message receiver and the interface of the email client of the message sender, so that all users may know the state information of the target message in their own email clients. It is unnecessary to open the IM conversation all the time and keep the IM conversation always in the display state, which is beneficial to improving the interactive efficiency between users.

For example, if the state information is unread message information used to characterize whether target information has been read by the receiver, the unread message information may be displayed on the interface of the email client of the first user and/or the interface of the email client of the second user in 120.

The unread message information may include, but be not limited to, an unread message prompt icon and/or the number of unread messages. The unread message prompt icon may be characterized by special symbols or graphics, such as a conversation box icon, a five-pointed star icon, and the like.

In an embodiment, when the email client of the first user detects that an unread message exists in the IM conversation, the unread message information may be displayed on the interface of the email client of the first user. For example, the unread message prompt icon and/or the number of unread messages may be displayed on the interface of the email client of the first user. Therefore, the first user may be directly prompted in the email client that the unread message sent by the second user exists currently, and the first user is not required to always open the IM conversation and wait for the second user to send the message. The first user may open the IM conversation in time to view the unread message sent by the second user based on the displayed unread message information, thereby ensuring timely knowledge of the unread message and avoiding a situation that nothing can be done within the waiting time due to always opening the IM conversation to ensure timely knowledge of unread message. According to the present disclosure, the unread message information is displayed in time, so that the user may know the unread message in time. Thus, the IM conversation is not required to be in the display state all the time, and the first user is not affected to do other things during the waiting time, thereby improving the user experience. The unread message information obtained by the email client of the first user based on the subscription may include the number of unread messages sent by the second user. Therefore, the number of unread messages sent by the second user may be acquired based on the obtained unread message information. The number of unread messages is displayed on the interface of the email client of the first user, so that the first user may quickly know the number of unread messages which has not been read currently, which further improves the user experience.

In addition, it can be understood that, if in the above step 110, marked information of the target message is acquired based on whether a preset mark is set on the target message in the instant messaging IM conversation. Correspondingly, in the above step 120, the marked information of the target message may be displayed on the interface of the email client of the first user and/or the interface of the email client of the second user.

For example, in some application scenarios, the message may be marked in the IM conversation, and the marked message is different from other unmarked messages. For example, the marked message has priority over other unmarked messages. Alternatively, the marked message may contain identification information of a receiver who is expected to pay attention to the target message by the sender. For example, the message may be marked with an @ identification. Accordingly, in these application scenarios, the marked information of the target message may be displayed on the interface of the email client of the first user and/or the interface of the email client of the second user, so that the message may be presented by the mail terminals of all parties in the IM conversation.

In the technical solution according to the embodiments of the present disclosure, after a first user shares a target mail with a second user, or the second user shares the target mail with the first user, state information of a target message in an instant messaging IM conversation is acquired. The state information is displayed on an interface of an email client of the first user or an interface of an email client of the second user based on the state information. Therefore, the user may know whether the target message exists in the IM conversation to which the user belongs, on the email client, which is beneficial to improving the interactive efficiency between users.

On the basis of the above technical solution, the displaying the number of unread messages on the interface of the email client of the first user may include: if unread messages sent by at least two second users for a pre-shared target mail exists in an IM client of the first user, acquiring the number of unread messages sent by each second user; and determining the total number of unread messages based on the number of unread messages sent by each second user, and displaying the total number of unread messages on the interface of the email client of the first user.

In an embodiment, when the target mail is shared with the IM user group or multiple single IM users, that is, when multiple users share the target mail, the unread message information obtained by the email client of the first user based on the subscription may include an identification of the second user who sends the unread message and the number of unread messages sent by each second user. Therefore, the email client of the first user may determine the second user who sends the unread message and the number of unread messages sent by the second user by monitoring the message queue. When there are at least two second users sending unread messages, the number of unread messages sent by each second user may be acquired and added to obtain the total number of unread messages, and the total number of unread messages is displayed on the interface of the email client of the first user. In this way, the first user may clearly know the current total number of unread messages, which further improves the user experience.

On the basis of the above technical solutions, in S120, the displaying the unread message information on the interface of the email client of the first user may include: in the email client of the first user, displaying the unread message information at a preset position of a target cell in a mail list including the target mail, where the target cell is configured to display abbreviative information of the target mail; and/or in the email client of the first user, displaying the unread message information at a preset position of a mail display interface of the target mail.

Figure 2:
FIG. 2 is an example showing information on an unread message according to the first embodiment of the present disclosure.

The abbreviative information of the target mail may include, but is not limited to, at least one of the recipient, sender, subject information and text summary information of the target mail. Each cell in the mail list may be used to store abbreviative information of the mail. For example, if the mail is stored separately in a form of a single mail in the email, the mail list is composed of single mails. That is, each cell in the mail list may be used to store abbreviative information of one mail. If the mail is classified and stored in a form of a mail group in the mailbox, as shown in FIG. 2, the mail list is composed of mail groups. That is, each cell in the mail list may be used to store abbreviative information of the mail group. Each mail group in the mailbox may be used to store matching mails, to realize the classified storage of mails. For example, mails with the same subject information and the same recipient information may be stored in the same mail group. Alternatively, mails with the same subject information and a reference relationship may also be stored in the same mail group. The preset position of the target cell may be any blank area in the target cell, such as a blank area on the left side of the recipients (Zhang San, Li Si) displayed in the target cell, as shown in FIG. 2.

The mail display interface of the target mail may be an interface for displaying mail detailed information of the target mail, such as a display area on the right side of the mail list. For example, if the mail is stored separately in the form of a single mail in the mailbox, the mail display interface of the target mail is only configured to display mail detailed information on the target mail. If the mail is classified and stored in the form of a mail group in the mailbox and the target mail is each mail in the mail group, the mail display interface of the target mail may be configured to display mail information on each target mail in the mail group, as shown in FIG. 2. The preset position on the mail display interface of the target mail may be any blank position in the mail display interface, such as a blank position on the top of the mail display interface.

In an embodiment, if an unread message is detected, in the email client of the first user, the unread message information, such as a five-pointed star icon shown in FIG. 2, may be displayed at the preset position of the target cell in the mail list including the target mail and/or the preset position on the mail display interface of the target mail. Therefore, the unread message information may be displayed at a fixed position of each mail, to prompt the first user that an unread message sent by the second user currently exists in the IM conversation corresponding to the target mail. Thus, the first user may open the IM conversation in time to view the unread message.

On the basis of the above technical solutions, the displaying the unread message information on the interface of the email client of the first user in S120 may include: dynamically displaying the unread message information on the interface of the email client of the first user, in a preset dynamic display mode.

In an embodiment, the preset dynamic display mode may be a dynamic display mode preset based on business requirements. For example, the preset dynamic display mode may include: display in a right-to-left order, which may be similar to a bullet screen display; or a cycle display in a clockwise or counterclockwise manner, or the like.

In an embodiment, if the unread message is detected, the unread message information may be displayed on the mail display interface of the target mail of the email client of the first user in a preset dynamic display mode to prompt the first user that the unread message is based on the target mail. The unread message information or prompt information including the unread message information and a target mail identification may be displayed on the entire display interface of the email client of the first user, in a preset dynamic display mode. Therefore, the first user may directly know the target mail targeted by the unread message, which improves the diversity and interest of the information display.

For example, the dynamically displaying the unread message information on the interface of the email client of the first user may include: dynamically displaying the unread message sent by the second user on the interface of the email client of the first user. In an embodiment, the unread message information obtained by the email client of the first user based on the subscription may include: a specific unread message sent by the second user. Therefore, the unread message sent by the second user may be acquired based on the obtained unread message information. Each unread message may be displayed on the interface of the email client of the first user in a preset dynamic display mode. Thereby, the dynamic display of unread message is realized, and the diversity and interest of the information display are further improved.

Second Embodiment

Figure 3:
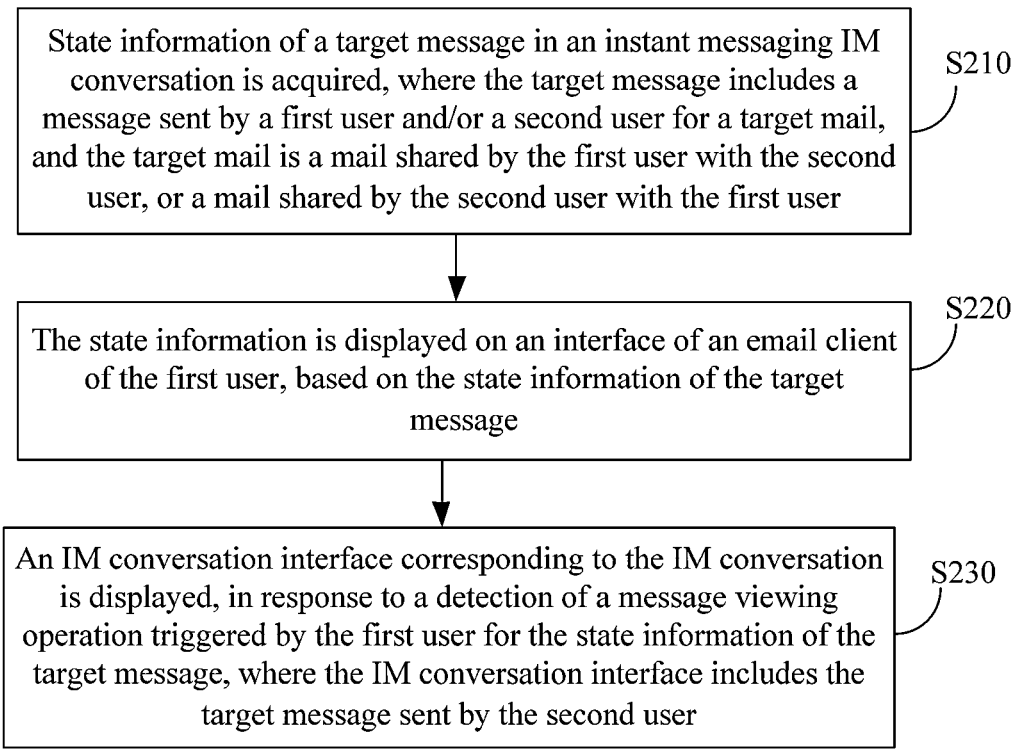
FIG. 3 is a schematic flowchart of a method for displaying information according to a second embodiment of the present disclosure.

FIG. 3 is a schematic flowchart of a method for displaying information according to a second embodiment of the present disclosure. This embodiment may be combined with the above embodiments, and after the state information is displayed on the interface of the email client of the first user, a step "displaying an IM conversation interface corresponding to the IM conversation, in response to a detection of a message viewing operation on the state information of the target message triggered by the first user, where the IM conversation interface includes the target message sent by the second user" is added. The explanations of terms that are the same as or corresponding to those in the above embodiments are not repeated here.

Referring to FIG. 3, the method for displaying the information according to this embodiment specifically includes the following S210 to S230.

In S210, state information of a target message in an instant messaging IM conversation is acquired, where the target message includes a message sent by a first user and/or a second user for a target mail, and the target mail is a mail shared by the first user with the second user, or a mail shared by the second user with the first user.

In S220, the state information is displayed on an interface of an email client of the first user, based on the state information of the target message.

In S230, an IM conversation interface corresponding to the IM conversation is displayed, in response to a detection of a message viewing operation triggered by the first user for the state information of the target message, where the IM conversation interface includes the target message sent by the second user.

In an embodiment, the first user may trigger the message viewing operation by clicking on the displayed state information of the target message. If the email client of the first user detects a message triggering operation, the IM conversation interface corresponding to the triggered state information of the target message may be automatically displayed. In this way, the user may timely view the target message sent by the second user on the IM conversation interface, and the first user is not required to search manually, thereby further improving the viewing efficiency.

For example, in S230, the IM conversation interface corresponding to the IM conversation is displayed by: jumping to the IM client of the first user, and displaying the IM conversation interface corresponding to the IM conversation on an interface of the IM client of the first user; or acquiring the target message sent by the second user, and displaying the IM conversation interface including the target message on the interface of the email client of the first user.

In an embodiment, if the email client of the first user detects the message viewing operation, the IM client of the first user may be automatically jumped to, and the IM conversation interface including the target message sent by the second user is displayed on the interface of the IM client of the first user, to realize the automatic display of the target message. Alternatively, the email client of the first user may acquire the target message sent by the second user. For example, an email server may acquire the target message sent by the second user by monitoring the message queue, and send the acquired target message to the email client of the first user. Thus, the email client of the first user may acquire the target message sent by the second user in real time. The email client of the first user may add the acquired target message to an IM conversation embedded in the email client. In this way, the IM conversation interface including the target message may be directly displayed in the email client of the first user. For example, the IM conversation interface including the target message may be displayed on the right side of the mail display interface of the target mail. Thus, the first user may view the target mail and the target message in the email client at the same time, thereby further improving the user experience.

In the technical solution according to the embodiments of the present disclosure, in response to detecting a message viewing operation triggered by the first user for the state information of the target message, the email client of the first user may automatically display an IM conversation interface including the target message sent by the second user, in response to the detection of the message viewing operation on the state information of the target message triggered by the first user. Thus, the first user is not required to search manually, thus viewing the target message more conveniently and further improving the viewing efficiency.

On the basis of the above technical solution, the method further includes: deleting the state information displayed on the interface of the email client of the first user, in response to the detection of the message viewing operation on the state information of the target message triggered by the first user.

In an embodiment, if the email client of the first user detects the message viewing operation, it indicates that the first user has learned the state information of the target message, so that the displayed state information may be deleted in time to ensure the accuracy of the state information prompt.

The following is an embodiment of an apparatus for displaying information according to an embodiment of the present disclosure. The apparatus and the method for displaying the information according to the above embodiments belong to the same inventive concept. For details that are not described in detail in the embodiment of the apparatus for displaying the information, reference may be made to the above embodiments of the method for displaying the information.

Third Embodiment

Figure 4:
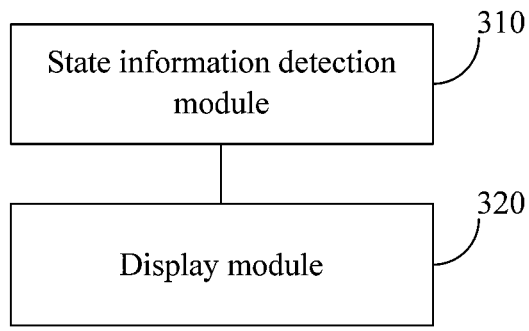
FIG. 4 is a schematic structural diagram of an apparatus for displaying information according to a third embodiment of the present disclosure.

FIG. 4 is a schematic structural diagram of an apparatus for displaying information according to a third embodiment of the present disclosure. This embodiment is applicable to a situation where information of a sharee is displayed on a shared target mail. The apparatus specifically includes a state information detection module 310 and a display module 320.

The state information detection module 310 is configured to acquire state information of a target message in an instant messaging IM conversation, where the target message includes a message sent by a first user and/or a second user for a target mail, and the target mail is a mail shared by the first user with the second user or a mail shared by the second user with the first user. The display module 320 is configured to display the state information on an interface of an email client of the first user and/or an interface of an email client of the second user, based on the state information of the target message.

In the technical solution according to the embodiments of the present disclosure, after a first user shares a target mail with a second user, or the second user shares the target mail with the first user, state information of a target message in an instant messaging IM conversation is acquired. The state information is displayed on an interface of an email client of the first user or an interface of an email client of the second user, based on the state information. Therefore, the user may know whether the target message exists in the IM conversation to which the user belongs, on the email client, which is beneficial to improving the interactive efficiency between users.

On the basis of the above technical solution, the state information detection module 310 is specifically configured to acquire unread message information based on whether the target message in the instant messaging IM conversation has been read by an information receiver. The display module 320 is specifically configured to display the unread message information on the interface of the email client of the first user and/or the interface of the email client of the second user.

On the basis of the above technical solutions, the display module 320 is specifically configured to display an unread message prompt icon and/or the number of unread messages on the interface of the email client of the first user and/or the interface of the email client of the second user.

On the basis of the above technical solutions, the display module 320 is further configured to if unread messages sent by at least two second users for a pre-shared target mail in an IM client of the first user, acquire the number of unread messages sent by each second user; and determine the total number of unread messages based on the number of unread messages sent by each second user, and display the total number of unread messages on the interface of the email client of the first user.

On the basis of the above technical solutions, the display module 320 is specifically configured to: in the email client of the first user, display the unread message information at a preset position of a target cell in a mail list including the target mail, where the target cell is configured to display abbreviative information of the target mail; and/or in the email client of the first user, display the unread message information at a preset position of a mail display interface of the target mail.

On the basis of the above technical solutions, the display module 320 is further configured to dynamically display the unread message information on the interface of the email client of the first user in a preset dynamic display mode.

On the basis of the above technical solutions, the display module 320 is further configured to dynamically display the unread message sent by the second user on the interface of the email client of the first user in the preset dynamic display mode.

On the basis of the above technical solutions, the apparatus further includes an IM conversation interface display module.

The IM conversation interface display module is configured to after the state information is displayed on the interface of the email client of the first user, display an IM conversation interface corresponding to the IM conversation, where the IM conversation interface includes the target message sent by the second user, in response to a detection of a message viewing operation triggered by the first user for the state information of the target message.

On the basis of the above technical solutions, the IM conversation interface display module is specifically configured to: jump to the IM client of the first user, and display the IM conversation interface corresponding to the IM conversation on an interface of the IM client of the first user; or acquire the target message sent by the second user, and display the IM conversation interface including the target message on the interface of the email client of the first user.

On the basis of the above technical solutions, the apparatus further includes a deletion module.

The deletion module is configured to delete the state information displayed on the interface of the email client of the first user, in response to a detection of a message viewing operation triggered by the first user for the state information of the target message.

On the basis of the above technical solutions, the state information detection module 310 is specifically configured to acquire marked information of the target message based on whether a preset mark is set on the target message in the instant messaging IM conversation. The display module 320 is specifically configured to display the marked information of the target message on the interface of the email client of the first user and/or the interface of the email client of the second user.

On the basis of the above technical solutions, the messages sent by the first user and the second user for the target mail includes at least one of:

a message received from a discussion group established based on the target mail; and a message replied to the target mail in the instant messaging IM conversation.

The apparatus for displaying the information according to the embodiment of the present disclosure may execute the method for displaying the information according to any embodiment of the present disclosure, and has corresponding functional modules and beneficial effects for executing the method for displaying the information.

It should be noted that, in the above embodiment of the apparatus for displaying the information, each unit and module included is divided according to its functional logic, but the above division is not limited as long as the corresponding functions can be realized. In addition, a name of each function unit is only intended to distinguish each other in convenience, and is not intended to limit the protection scope of the present disclosure.

Fourth Embodiment

Figure 5:
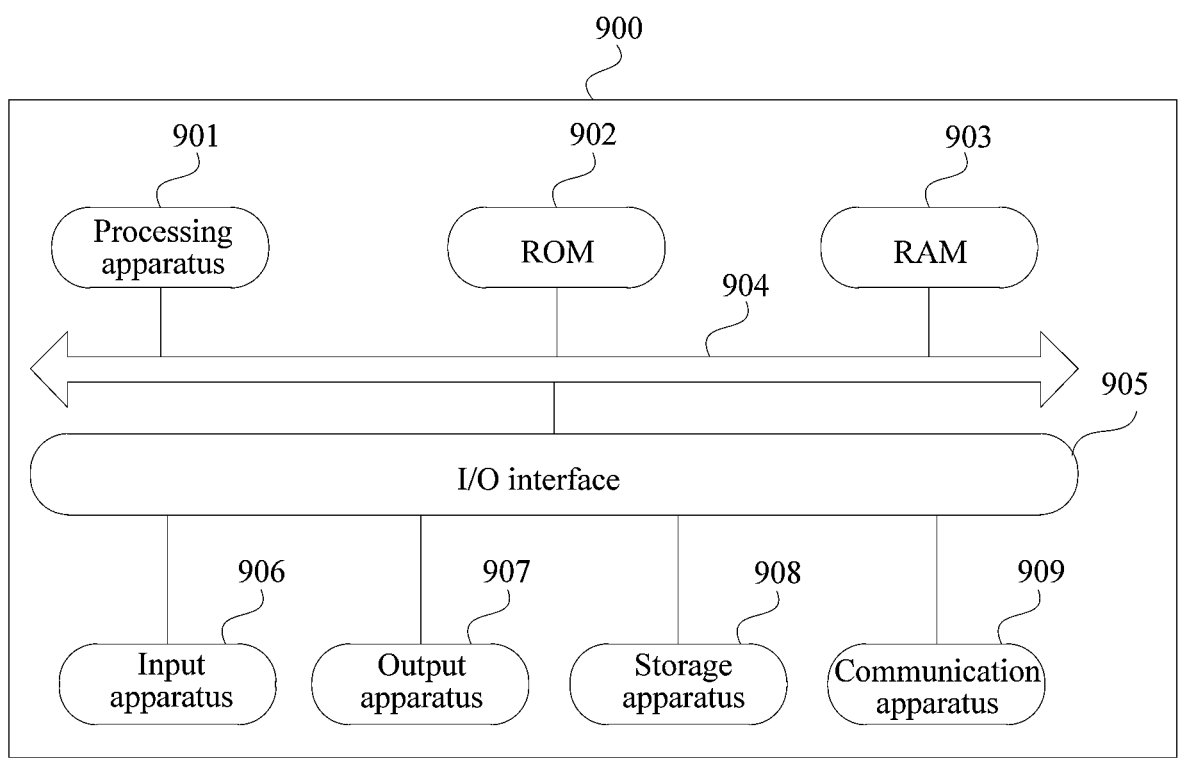
FIG. 5 is a schematic structural diagram of an electronic device according to a fourth embodiment of the present disclosure.

Reference is made to FIG. 5, which is a schematic structural diagram of an electronic device (e.g., a terminal device or a server in FIG. 5) 900 suitable for implementing the embodiments of the present disclosure. The terminal device according to the embodiments of the present disclosure may include, but is not limited to, mobile phones, laptops, digital broadcast receivers, PDAs (personal digital assistants), PADs (tablets), PMPs (portable multimedia players), vehicle-mounted terminals (such as in-vehicle navigation terminals) and other mobile terminals and fixed terminals such as digital TVs and desktop computers. The electronic device shown in FIG. 5 is only exemplary, and should not indicate any limitation to the function and scope of application of the embodiments of the present disclosure.

As shown in FIG. 5, the electronic device 900 may include a processing apparatus (e.g., a central processing unit or a graphics processor) 901, which may execute various operations and processing based on a program stored in a read only memory (ROM) 902 or a program loaded from a storage apparatus 908 into a random access memory (RAM) 903. The RAM 903 is further configured to store various programs and data required by the electronic device 900 to perform an operation. The processing apparatus 901, the ROM 902 and the RAM 903 are connected to each other through a bus 904. An input/output (I/O) interface 905 is also connected to the bus 904.

Generally, the I/O interface 905 may be connected to: an input apparatus 906, such as a touch screen, a touch panel, a keyboard, a mouse, a camera, a microphone, an accelerometer, and a gyroscope; an output apparatus 907, such as a liquid crystal display (LCD), a speaker, and a vibrator; a storage apparatus 908 such as a magnetic tape and a hard disk; and a communication apparatus 909. The communication apparatus 909 enables wireless or wired communication between the electronic device 900 and other devices for data exchanging. Although FIG. 5 shows an electronic device 900 having various components, it should be understood that the illustrated components are not necessarily required to all be implemented or included. Alternatively, more or fewer components may be implemented or included.

Particularly, according to the embodiments of the present disclosure, the processes described above with reference to the flowcharts may be implemented as a computer software program. For example, a computer program product is further provided as an embodiment in the present disclosure, including a computer program carried on a non-transitory computer readable medium. The computer program includes program code for performing the method shown in the flowchart. In the embodiment, the computer program may be downloaded and installed from the network via the communication apparatus 909, or installed from the storage apparatus 908, or installed from the ROM 902. When the computer program is executed by the processing apparatus 901, the functions defined in the method according to the embodiment of the present disclosure are performed.

The electronic device according to the embodiment of the present disclosure and the method for displaying the information according to the above embodiments belong to a same inventive concept. For technical details not described in detail in the embodiment of the present disclosure, reference may be made to the above embodiments, and the embodiment of the present disclosure has the same beneficial effects as the above embodiments.

Fifth Embodiment

According to an embodiment of the present disclosure, a computer storage medium having stored thereon a computer program is provided. The program is executed by a processor to implement the method for displaying the information according to the above embodiments.

It is to be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read only memory (ROM), an erasable programmable read only memory (EPROM or flash memory), an optical fiber, a portable compact disc read only memory (CD-ROM), a light storage device, a magnetic storage device or any proper combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium, and may send, propagate or transmit programs to be used by or in combination with an instruction execution system, apparatus or device. The program codes included in the computer readable medium may be transmitted via any proper medium including but not limited to: a wire, an optical cable, radio frequency (RF) and the like, or any proper combination thereof.

In some embodiments, the client and the server may communicate using any currently known or future developed network protocol such as HyperText Transfer Protocol (HTTP), and may be interconnected with any form or medium of digital data communication (e.g., a communication network). Examples of the communication network include a local area network ("LAN"), a wide area network ("WAN"), the internet (e.g., the Internet), and an end-to-end network (e.g., ad hoc end-to-end network) or any of a currently known or a future developed network.

The computer readable medium may be incorporated in the electronic device, or may exist alone without being assembled into the electronic device.

The computer readable medium carries one or more programs. The one or more programs, when executed by the electronic device, cause the electronic device to:

acquire state information of a target message in an instant messaging IM conversation, where the target message includes a message sent by a first user and/or a second user for a target mail, and the target mail is a mail shared by the first user with the second user, or a mail shared by the second user with the first user; and display the state information on an interface of an email client of the first user and/or an interface of an email client of the second user, based on the state information of the target message.

The computer program code for performing the operations disclosed in the present disclosure may be written in one or more programming languages or combinations thereof. The programming languages include but are not limited to an object-oriented programming language, such as Java, Smalltalk, and C++, and a conventional procedural programming language, such as C language or a similar programming language. The program code may be executed entirely on a user computer, partially on the user computer, as an standalone software package, partially on the user computer and partially on a remote computer, or entirely on the remote computer or a server. In a case involving a remote computer, the remote computer may be connected to a user computer or an external computer through any kind of network including local area network (LAN) or wide area network (WAN). For example, the remote computer may be connected through Internet connection by an Internet service provider.

Flowcharts and block diagrams in the drawings illustrate the architecture, functions and operations that may be implemented by the system, method and computer program product according to the embodiments of the present disclosure. In this regard, each block in the flowcharts or the block diagrams may represent a module, a program segment, or a part of code. The module, the program segment, or the part of code contains one or more executable instructions for implementing the specified logical function. It should be also noted that, in some alternative implementations, the functions shown in the blocks may be performed in an order different from the order shown in the drawings. For example, two blocks shown in succession may actually be executed in parallel, or sometimes may be executed in a reverse order, which depends on the functions involved. It should also be noted that, each block in the block diagrams and/or the flowcharts and a combination of blocks in the block diagrams and/or the flowcharts may be implemented by a dedicated hardware-based system performing specified functions or operations, or may be implemented by a combination of dedicated hardware and computer instructions.

The units mentioned in the description of the embodiments of the present disclosure may be implemented by means of software, or otherwise by means of hardware. The name of the unit does not constitute a limitation on the unit itself under certain circumstances. For example, an editable content display unit may also be described as an "editing unit".

The functions described herein above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and the like.

In the present disclosure, a machine readable medium may be a tangible medium, which may contain or store a program used by the instruction execution system, apparatus, or device or a program used in combination with the instruction execution system, apparatus, or device. The machine readable medium may be a machine readable signal medium or a machine readable storage medium. The machine readable medium may include, but is not limited to, a system, an apparatus or a device in an electronic, magnetic, optical, electromagnetic, infrared, or semi-conductive form, or any suitable combination thereof. The machine readable storage medium, for example, includes an electrical connection based on one or more wires, a portable computer disk, a hard disk, a random access memory (RAM), a read only memory (ROM), an erasable programmable read only memory (EPROM or flash memory), an optical fiber, a portable compact disc read only memory (CD-ROM), an optical storage device, a magnetic storage device, or any suitable combination thereof.

According to one or more embodiments of the present disclosure, a method for displaying information is provided in a first example. The method includes:

acquiring state information of a target message in an instant messaging IM conversation, where the target message includes a message sent by a first user and/or a second user for a target mail, and the target mail is a mail shared by the first user with the second user, or a mail shared by the second user with the first user; and displaying the state information on an interface of an email client of the first user and/or an interface of an email client of the second user, based on the state information of the target message.

According to one or more embodiments of the present disclosure, the method for displaying the information is provided in a second example. In the method, the acquiring state information of a target message in an instant messaging IM conversation includes:

acquiring unread message information based on whether the target message in the instant messaging IM conversation has been read by an information receiver; and the displaying the state information on an interface of an email client of the first user and/or an interface of an email client of the second user includes:

displaying the unread message information on the interface of the email client of the first user and/or the interface of the email client of the second user.

According to one or more embodiments of the present disclosure, the method for displaying the information is provided in a third example. In the method, the displaying the unread message information on the interface of the email client of the first user and/or the interface of the email client of the second user includes:

displaying an unread message prompt icon and/or the number of unread messages on the interface of the email client of the first user and/or the interface of the email client of the second user.

According to one or more embodiments of the present disclosure, the method for displaying the information is provided in a fourth example. In the method, the displaying the number of unread messages on the interface of the email client of the first user includes:

if unread messages sent by at least two second users for a pre-shared target mail exists in an IM client of the first user, acquiring the number of unread messages sent by each second user; and determining the total number of unread messages based on the number of unread messages sent by each second user, and displaying the total number of unread messages on the interface of the email client of the first user.

According to one or more embodiments of the present disclosure, the method for displaying the information is provided in a fifth example. In the method, the displaying the unread message information on the interface of the email client of the first user includes:

in the email client of the first user, displaying the unread message information at a preset position of a target cell in a mail list including the target mail, where the target cell is configured to display abbreviative information of the target mail; and/or in the email client of the first user, displaying the unread message information at a preset position of a mail display interface of the target mail.

According to one or more embodiments of the present disclosure, the method for displaying the information is provided in a sixth example. In the method, the displaying the unread message information on the interface of the email client of the first user includes:

dynamically displaying the unread message information on the interface of the email client of the first user in a preset dynamic display mode.

According to one or more embodiments of the present disclosure, the method for displaying the information is provided in a seventh example. In the method, the dynamically displaying the unread message information on the interface of the email client of the first user includes:

dynamically displaying an unread message sent by the second user on the interface of the email client of the first user.

According to one or more embodiments of the present disclosure, the method for displaying the information is provided in an eighth example. In the method, after displaying the state information on the interface of the email client of the first user, the method further includes:

displaying an IM conversation interface corresponding to the IM conversation, where the IM conversation interface includes the target message sent by the second user, in response to a detection of a message viewing operation triggered by the first user for the state information of the target message.

According to one or more embodiments of the present disclosure, the method for displaying the information is provided in a ninth example. In the method, the displaying an IM conversation interface corresponding to the IM conversation includes:

jumping to an IM client of the first user, and displaying the IM conversation interface corresponding to the IM conversation on an interface of the IM client of the first user; or acquiring the target message sent by the second user, and displaying the IM conversation interface including the target message on the interface of the email client of the first user.

According to one or more embodiments of the present disclosure, the method for displaying the information is provided in a tenth example. In the method, after displaying the state information on the interface of the email client of the first user, the method further includes:

deleting the state information displayed on the interface of the email client of the first user, in response to a detection of a message viewing operation triggered by the first user for the state information of the target message.

According to one or more embodiments of the present disclosure, the method for displaying the information is provided in an eleventh example. In the method, the acquiring state information of a target message in an instant messaging IM conversation includes:

acquiring marked information of the target message based on whether a preset mark is set on the target message in the instant messaging IM conversation; and the displaying the state information on an interface of an email client of the first user and/or an interface of an email client of the second user includes:

displaying the marked information of the target message on the interface of the email client of the first user and/or the interface of the email client of the second user.

According to one or more embodiments of the present disclosure, the method for displaying the information is provided in a twelfth example. In the method, the message sent by the first user and the second user for the target mail includes at least one of:

a message received from a discussion group established based on the target mail; and a message replied to the target mail in the instant messaging IM conversation.

According to one or more embodiments of the present disclosure, an apparatus for displaying information is provided in a thirteenth example. The apparatus includes a state information detection module and a display module.

The state information detection module is configured to acquire state information of a target message in an instant messaging IM conversation, where the target message includes a message sent by a first user and/or a second user for a target mail, and the target mail is a mail shared by the first user with the second user, or a mail shared by the second user with the first user.

The display module is configured to display the state information on an interface of an email client of the first user and/or an interface of an email client of the second user, based on the state information of the target message.

The above descriptions are only preferred embodiments of the present disclosure and explanations of the technical principles used in the present disclosure. Those skilled in the art should understand that the scope of the present disclosure is not limited to the technical solution formed by combination of the technical features described above, but also covers other technical solutions formed by any combination of the above technical features or the equivalent features of the technical features without departing from the concept of the present disclosure. For example, the scope of the present disclosure may cover a technical solution formed by replacing the features described above with technical features with similar functions disclosed in (but not limited to) the present disclosure.

In addition, although the above operations are described in a specific order, it should not be understood that these operations are required to be performed in the specific order or performed in a sequential order. In some conditions, multitasking and parallel processing may be advantageous. Similarly, although multiple implementation details are included in the above descriptions, the details should not be interpreted as limitations to the scope of the present disclosure. Some features described in an embodiment may be implemented in combination in another embodiment. In addition, the features described in an embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. The specific features and actions described above are only examples of the implementation of the claims.

The invention claimed is:

1. A method for displaying information, comprising:
acquiring state information of a target message in an instant messaging IM conversation, wherein the target message comprises a message sent by a first user and/or a second user for a target mail, and the target mail is a mail shared by the first user with the second user, or a mail shared by the second user with the first user; and
displaying the state information on an interface of an email client of the first user and/or an interface of an email client of the second user, based on the state information of the target message,
wherein after displaying the state information on the interface of the email client of the first user, the method further comprises:
displaying an IM conversation interface corresponding to the IM conversation, in response to a detection of a message viewing operation triggered by the first user for the state information of the target message, wherein the IM conversation interface comprises the target message sent by the second user.

2. The method according to claim 1, wherein the acquiring state information of a target message in an instant messaging IM conversation comprises:
acquiring unread message information based on whether the target message in the instant messaging IM conversation has been read by an information receiver; and
the displaying the state information on an interface of an email client of the first user and/or an interface of an email client of the second user comprises:
displaying the unread message information on the interface of the email client of the first user and/or the interface of the email client of the second user.

3. The method according to claim 2, wherein the displaying the unread message information on the interface of the email client of the first user and/or the interface of the email client of the second user comprises:
displaying an unread message prompt icon and/or the number of unread messages on the interface of the email client of the first user and/or the interface of the email client of the second user.

4. The method according to claim 3, wherein the displaying the number of unread messages on the interface of the email client of the first user comprises:

if unread messages sent by at least two second users for a pre-shared target mail exists in an IM client of the first user, acquiring the number of unread messages sent by each second user; and determining a total number of unread messages based on the number of unread messages sent by each second user, and displaying the total number of unread messages on the interface of the email client of the first user.

5. The method according to claim 2, wherein the displaying the unread message information on the interface of the email client of the first user comprises:

displaying, in the email client of the first user, the unread message information at a preset position of a target cell in a mail list including the target mail, wherein the target cell is configured to display abbreviative information of the target mail; and/or displaying, in the email client of the first user, the unread message information at a preset position of a mail display interface of the target mail.

6. The method according to claim 2, wherein the displaying the unread message information on the interface of the email client of the first user comprises:

dynamically displaying the unread message information on the interface of the email client of the first user in a preset dynamic display mode.

7. The method according to claim 6, wherein the dynamically displaying the unread message information on the interface of the email client of the first user in a preset dynamic display mode comprises:

dynamically displaying the unread message information on a mail display interface of the target mail of the email client of the first user.

8. The method according to claim 6, wherein the dynamically displaying the unread message information on the interface of the email client of the first user comprises:

dynamically displaying an unread message sent by the second user on the interface of the email client of the first user.

9. The method according to claim 2, wherein the displaying the unread message information on the interface of the email client of the first user comprises:

dynamically displaying prompt information including the unread message information and a target mail identification, on the interface of the email client of the first user in a preset dynamic display mode.

10. The method according to claim 6, wherein the dynamic display mode comprises at least one of a bullet screen display mode and a cycle display mode.

11. The method according to claim 1, wherein the displaying an IM conversation interface corresponding to the IM conversation comprises:

jumping to an IM client of the first user, and displaying the IM conversation interface corresponding to the IM conversation on an interface of the IM client of the first user; or acquiring the target message sent by the second user, and displaying the IM conversation interface including the target message on the interface of the email client of the first user.

12. The method according to claim 1, wherein after displaying the state information on the interface of the email client of the first user, the method further comprises:

deleting the state information displayed on the interface of the email client of the first user, in response to a detection of a message viewing operation triggered by the first user for the state information of the target message.

13. The method according to claim 1, wherein the acquiring state information of a target message in an instant messaging IM conversation comprises:

acquiring marked information of the target message based on whether a preset mark is set on the target message in the instant messaging IM conversation; and the displaying the state information on an interface of an email client of the first user and/or an interface of an email client of the second user comprises:

displaying the marked information of the target message on the interface of the email client of the first user and/or the interface of the email client of the second user.

14. The method according to claim 13, wherein the marked information comprises identification information of a receiver who is expected to pay attention to the target message, and/or priority information of the target message.

15. The method according to claim 1, wherein the message sent by the first user and/or the second user for the target mail comprises at least one of:

a message received from a discussion group established based on the target mail; and a message replied to the target mail in the instant messaging IM conversation.

16. The method according to claim 1, wherein the message sent by the first user and/or the second user for the target mail comprises a message sent after the target mail has been shared in the IM conversation.

17. The method according to claim 16, wherein the message comprises a message related to the target mail.

18. An electronic device, comprising:

one or more processors; and a memory configured to store one or more programs, wherein the one or more programs, when executed by the one or more processors, cause the one or more processors to acquire state information of a target message in an instant messaging IM conversation, wherein the target message comprises a message sent by a first user and/or a second user for a target mail, and the target mail is a mail shared by the first user with the second user, or a mail shared by the second user with the first user; and display the state information on an interface of an email client of the first user and/or an interface of an email client of the second user, based on the state information of the target message, wherein the one or more programs, when executed by the one or more processors, cause the one or more processors to:

after the state information is displayed on the interface of the email client of the first user, display an IM conversation interface corresponding to the IM conversation, in response to a detection of a message viewing operation triggered by the first user for the state information of the target message, wherein the IM conversation interface comprises the target message sent by the second user.

19. A non-transitory computer readable storage medium storing a computer program thereon, wherein the program, when executed by a processor, causes the processor to acquire state information of a target message in an instant messaging IM conversation, wherein the target message comprises a message sent by a first user and/or a second user for a target mail, and the target mail is a mail shared by the first user with the second user, or a mail shared by the second user with the first user; and display the state information on an interface of an email client of the first user and/or an interface of an email client of the second user, based on the state information of the target message, wherein the program, when executed by a processor, causes the processor to after the state information is displayed on the interface of the email client of the first user, display an IM conversation interface corresponding to the IM conversation, in response to a detection of a message viewing operation triggered by the first user for the state information of the target message, wherein the IM conversation interface comprises the target message sent by the second user.

* * * * *